United States Patent [19]
Bequette et al.

[11] Patent Number: 5,858,415
[45] Date of Patent: Jan. 12, 1999

[54] RAW MATERIAL DELIVERY SYSTEM FOR COMPACTING PRESS

[75] Inventors: Todd A. Bequette, Geneva; Jeffrey C. Kelly, DeKalb; Thomas J. Krave, Aurora; Robert S. Porter, Batavia; Michael J. Dorband; Mark W. Green, both of St. Charles, all of Ill.

[73] Assignee: Amsted Industries Incorporated, Chicago, Ill.

[21] Appl. No.: 768,977

[22] Filed: Dec. 18, 1996

[51] Int. Cl.$^6$ ..................... B29C 31/06
[52] U.S. Cl. ............... 425/78; 425/258; 425/448; 425/454
[58] Field of Search ............. 425/78, 219, 256, 425/257, 258, 259, 260, 406, 448, 454

[56] References Cited

U.S. PATENT DOCUMENTS

| | | |
|---|---|---|
| 2,839,786 | 6/1958 | Alesi . |
| 3,832,107 | 8/1974 | Cox et al. ................ 425/78 |
| 3,988,088 | 10/1976 | King et al. ............... 425/78 |
| 4,027,790 | 6/1977 | King . |
| 4,327,996 | 5/1982 | Affolder .................. 425/78 |
| 5,154,881 | 10/1992 | Rutz et al. ............... 419/37 |
| 5,213,816 | 5/1993 | Smyth, Jr. et al. ........ 425/78 |
| 5,253,993 | 10/1993 | Birkenstock et al. ...... 425/258 |
| 5,256,053 | 10/1993 | Haguchi ................. 425/258 |
| 5,593,707 | 1/1997 | Goe et al. .............. 425/258 |

FOREIGN PATENT DOCUMENTS

50-7084  3/1975  Japan ................... 425/258

*Primary Examiner*—James P. Mackey
*Attorney, Agent, or Firm*—Edward J. Brosius; F. S. Gregorczyk; Stephen J. Manich

[57] ABSTRACT

A raw material delivery system is disclosed. It is used with a press of the type used to compact raw material in a die. The press has a horizontal table with an opening in which the die is held. A feed shoe is movable across the table between an extended position where a central bore of the feed shoe overlies the die and a retracted position where the central bore is aligned with a bore in a bridge. A vertically movable feed tube is carried on the bridge, and has a passage through which raw material may pass. The vertically movable feed tube receives raw material from a vertically fixed feed tube received telescopically within the vertically movable feed tube. A valve is between the two feed tubes. A valve may be provided between the bridge and the feed shoe so that the raw material passes through this interface without being exposed to cross-ventilation. The vertically movable feed tube may be pivotally connected to the bridge so that the movable feed tube may be pivoted away from the bridge opening when it is desired to change the metal powder or the die. Both the fixed and movable feed tubes may be heated, and heated material may be received by the fixed tube.

42 Claims, 7 Drawing Sheets

RAW MATERIAL DELIVERY SYSTEM FOR COMPACTING PRESS

FIELD OF THE INVENTION

The present invention relates to a system for delivering raw material to a compacting press, and more particularly, to a system for heating powdered metal and delivering the heated powdered metal to a die for compaction into a green metal part.

BACKGROUND OF THE INVENTION

It is known to produce metal parts by compacting powdered metal and heating the compacted metal powder to sinter the metal particles to produce a finished metal product. However, such products are known to have lower densities than comparable wrought metal products. To achieve greater densities, products have been subjected to secondary operations, such as using a second coining operation.

Recently, there has been interest in the use of a compacting press to manufacture metal parts from metal powders where the metal particles are coated with a thin polymer lubricant. The polymer coatings are believed to lubricate the interfaces between metal particles and forming tool surfaces thereby making it easier to form workpieces due to decreases in the internal friction and stresses created during compaction. First level workpieces using conventional lubricated powders have been compacted into workpieces having final densities in the range of 6.8–7.1 grams per cubic centimeter (g/cc) when compacting at pressures of 35–60 TSI. To obtain higher densities, over 7.2 g/cc, a workpiece is typically first green-formed using lubricated powders to a density of about 6.8, and then pre-sintered to a temperature typically between 1400 and 1700 degrees Fahrenheit (°F.) in order to burn out the lubricants, relieve internal stresses, and to promote mechanical bonding. Next, the workpiece surface is coated with a lubricant and pressed a second time to reach the preferred density range. As can be appreciated with such level 2 and 3 workpieces, reaching higher density levels becomes costly and time-consuming; moreover, there may be density fluctuations in the workpiece after the second pressing. And while advancements in the use of lubricants and other materials have allowed for production of workpieces with increased densities without resorting to secondary operations, pressing a room-temperature lubricated powder to a density in the range of 7.1 g/cc has its price: for example, the compressive forces are typically very high in such operations, on the order of at least 100,000 psi, and the wear of the tools is accelerated; moreover, with the much higher compressive forces needed to reach these densities, the workpieces can develop surface irregularities from the extreme internal stresses.

More recent discoveries have found that pre-heating the polymer lubricated products has helped not only to obtain higher densities at lower compacting pressures, but also to achieve homogeneous workpiece densities. Homogeneous workpiece density levels greater than 7.4 g/cc can be obtained. Generally, by using warm lubricated metal powders, it has been possible to increase densities by about 0.2 g/cc while eliminating the second coining or pressing operation.

However, problems have arisen with the apparatus necessary to heat the polymer-coated metal powder and deliver the warm powder to the die in the compacting press. When heated to a temperature just below a critical powder temperature (about 300 degrees Fahrenheit) prior to loading the material into the die cavity, the heated powder may become tacky and coagulate. Typical powder delivery systems have used flexible, accordion-pleated hoses for transferring powder to the die cavity; but when such hoses are used with warm powder, the powder may gather in the interstices of the pleats, become compacted and block the hose. Since the usual production method requires accurate gravity-controlled filling of the powder into the die cavity from a delivery shoe, any coagulation or tackiness of the coated powder can cause variations in the amount of powder that is actually deposited in the die cavity. Other problems may result from the tacky powder creating blockage in the powder delivery system. In addition, conventional flexible hoses and seals may degrade or be destroyed when exposed to the elevated temperature of the warm powder.

One attempt to solve these problems in the art is shown in U.S. Pat. No. 5,213,816 (1993) to Smith, Jr. et al. In that patent, which discloses an auger conveyor assembly and a shuttle assembly, the auger assembly has a horizontal tube with an interior auger which is fed powdered metal through a vertical tube. These parts are heated. The discharge end of the heated horizontal tube overlies a heated hopper in the shuttle assembly, and the heated metal powder is dropped into the shuttle hopper and to a heated ring. This design has problems associated with its operation. First, the heated powder drops through the air from the discharge end of the horizontal tube to the hopper, allowing the metal powder to cool, and in the case of mixtures of different metal powders, to separate into a less homogeneous mixture. In addition, to change the machine over from one type of metal powder to another may be difficult and time-consuming. Changing the die in the compacting press may also be difficult because of the presence of the shuttle assembly.

SUMMARY OF THE INVENTION

The present invention provides a system for delivering raw material to a die cavity in a compaction press. The raw material may be delivered at room temperature or it may be heated before delivery In either case, the raw material is not compacted before delivery to the die cavity, and there is minimal opportunity for the raw material to coagulate. Warm raw material may be delivered without degradation and without cooling by exposure to cross-ventilation. Whether or not the raw material is warmed, changing from one raw material to another may be accomplished quickly, easily and simply; similarly, the die may also be changed quickly, easily and simply.

In one aspect, the present invention provides, in a press for compacting raw material, the press being of the type having a table with a horizontal surface and an opening in the horizontal surface for raw material to be delivered to the die, a system for delivering raw material to a die. The system includes a feed shoe having a central bore. The feed shoe is movable in a direction parallel to the table surface between an extended position wherein the central bore overlies the die and a retracted position wherein the central bore is spaced from the die. The system also includes a vertically movable feed tube for delivering raw material to the central bore of the feed shoe. The vertically movable feed tube has top and bottom ends with openings in each end and a passage between the openings. The feed shoe is movable to the retracted position wherein the central bore of the feed shoe is aligned with the bottom opening so that raw material can travel from the top opening through the passage and out of the bottom opening and into the central bore when the feed shoe is in the retracted position. The vertically movable feed tube is supported to move with vertical movement of the table. A vertically fixed feed tube is telescopically received in the vertically movable feed tube. The fixed feed tube has top and bottom ends and a passage between the top and bottom ends, the passage being capable of receiving and holding raw material. The system also includes means for selectively allowing raw material to pass from the vertically fixed tube through to the vertically movable feed tube.

In another aspect, the present invention provides, in a press for compacting raw material in a die to produce a product, the press being of the type having a table with a horizontal surface for raw material to be delivered to the die, a system for heating raw material and delivering the heated raw material to a die. The system includes a feed shoe having a central bore. The feed shoe is movable in a direction parallel to the horizontal surface of the table. The system also includes a feed tube having top and bottom openings and a passage between the openings. The feed shoe is movable on the table to a retracted position wherein the central bore is aligned to receive raw material from the bottom opening and an extended position wherein the central bore is aligned over the die cavity. The system also includes means for heating the tube so that raw material in the passage may be heated and an enclosure with a bore through which raw material may pass. The enclosure is positioned between the feed shoe upper surface and the bottom opening of the feed tube so that when the feed shoe is in the retracted position, material passing from the feed tube bottom opening to the feed shoe central bore passes substantially free from exposure to a cross-flow of air.

In another aspect, the present invention provides, in a press for compacting raw material in a die to produce a product, the press being of the type having a horizontal table with a horizontal surface and an opening in the horizontal surface for raw material to be delivered to the die, a system for delivering raw material. The system comprises a feed shoe having a central bore. The feed shoe is movable in a direction parallel to the horizontal surface of the table. A feed tube is also provided having a top and bottom ends and a passage extending between the openings. A horizontal plate is positioned above the surface of the table and has a plate bore extending through the plate. The system also provides means for pivotally mounting the bottom end of the feed tube on the horizontal plate so that the bottom opening can be pivoted to a delivery position aligned with the plate bore and can be pivoted to a drain position wherein the bottom opening is spaced from the plate bore. The feed shoe is movable on the table to a retracted position wherein the central bore is aligned beneath the bottom opening of the feed tube and the plate bore to receive raw material from the feed tube and an extended position wherein the central bore is aligned over the die cavity.

In another aspect, the present invention provides, in a press for compacting raw material in a die to produce a product, the press being of the type having a table with a horizontal surface and an opening in the horizontal surface for raw material to be delivered to the die cavity, a system for delivering raw material to a die comprising a horizontal plate positioned above the surface of the table and having a plate bore extending through the plate. A feed shoe having a central bore is provided. The feed shoe is movable in a direction parallel to the table surface between an extended position wherein the central bore of the feed shoe overlies the die cavity and a retracted position wherein the central bore of the feed shoe is aligned with the plate bore. The system also includes a vertically movable feed tube for delivering raw material to said central bore of the feed shoe. The vertically movable feed tube has top and bottom ends with openings in each end and a passage between said openings. The feed shoe is movable to the retracted position wherein the central bore of the feed shoe is aligned with said bottom opening, so that raw material can travel from said top opening through the passage and out the bottom opening and into the central bore when said feed shoe is in the retracted position. The vertically movable feed tube is supported to move with vertical movement of the table. A vertically fixed feed tube is telescopically received in the vertically movable feed tube. The fixed feed tube has top and bottom ends and a passage between said top and bottom ends. The passage is capable of receiving and holding raw material. The system also includes means for selectively allowing raw material to pass from the vertically fixed tube through to the vertically movable feed tube. Means are provided for heating a portion of the vertically movable feed tube so that raw material in the passage is heated. A seal is provided. It has a central bore through which raw material may pass, and is positioned between the feed shoe upper surface and the bottom opening of the vertically movable feed tube so that when the feed shoe is in the retracted position material passing from the bottom opening to the central bore passes substantially free from exposure to a cross flow of air. Means are provided for pivotally mounting the bottom end of the feed tube on the horizontal plate so that the bottom opening can be pivoted to a delivery position aligned with the plate bore and can be pivoted to a drain position wherein the bottom opening is spaced from the plate bore.

DETAILED DESCRIPTION

According to the invention, there is provided a raw material feed system generally designated 10 in the accompanying drawings. It is useful in conjunction with a compacting press machine, such as those typically used in powder metallurgy applications. In such powder metallurgy applications, compacting press machines generally include a table 12 with a die cavity 14 in a die 16. Generally, powdered metal is placed in the die, and press elements compact the powdered metal to produce a raw product that is then sintered to produce a final product, as is well known in the art. To eject the part from the die 16, the table 12 of the press generally lowers from the plane shown in FIG. 1 and the product is ejected from the die.

As understood by those skilled in the art, it is necessary to get the proper quantity of raw material in place in the die 16 before the compaction process begins. The present invention addresses the need for an improved apparatus for delivering the raw material, which may be powdered metal, to the die.

Figure 1:
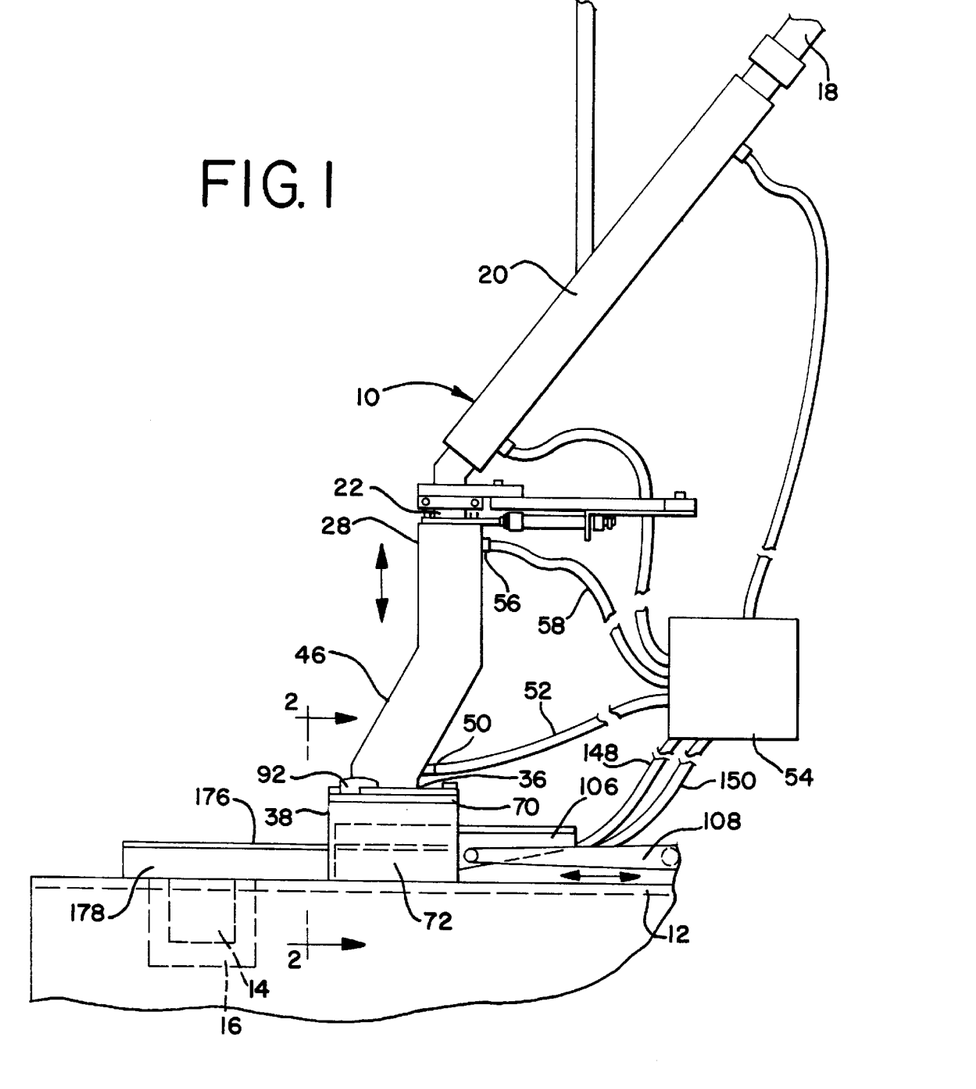
FIG. 1 is a side elevation of an embodiment of the raw material delivery system of the present invention.
Figures 4, 5:
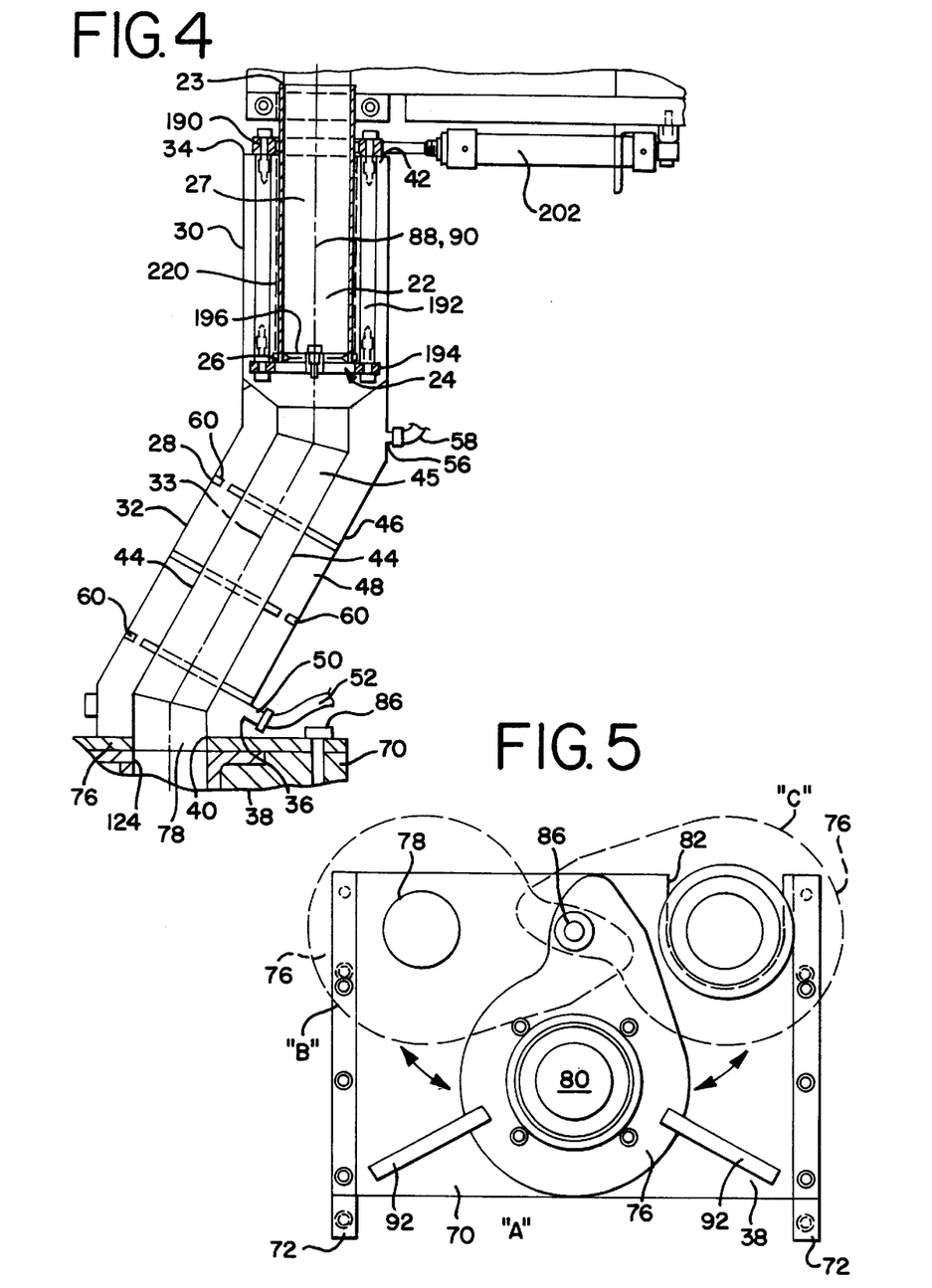
FIG. 4 is a partial cross-section, taken along line 4—4 of FIG. 2.
FIG. 5 is a top plan view of the bridge of the embodiment of FIG. 1, with parts removed for clarity.

As illustrated, raw material such as powdered metal may be delivered to the delivery system of the present invention through an augered feeder 18, as typically done in the art. The delivery system of the present invention may be used with either traditional cold feed systems or with warm feed systems. The embodiment of FIG. 1 is a warm powder delivery system, having a pre-heater 20 which receives powdered metal from the discharge end of the augered feeder 18 or other feed mechanism. From the pre-heater, or from some other source, the powdered metal may be gravity fed to a vertical feed tube 22, which is open at its top end 23 and has a valve 24 at its lower or bottom end 26, with an open passage 27 between them, as shown in FIG. 4. The vertical fixed feed tube 22 is fixed against vertical movement by its attachment to a suitable support structure, as will be understood by those skilled in the art. The valve 24 is attached to the vertical fixed feed tube and is thereby also vertically fixed. When the valve 24 is open, the warm powdered metal is gravity fed from the fixed feed tube 22 through the valve 24 into a vertically movable feed tube 28. The vertically movable tube 28 has two sections, a first section 30 that is coaxial with the fixed vertical feed tube 22 and a second integral section 32 that has a central longitudinal axis 33 that intersects the central longitudinal axis 88 of the first section 30 at an obtuse angle, as shown in FIG. 4.

In the illustrated embodiment, the vertically fixed feed tube 22 and valve 24 are telescopically received within the first coaxial section 30 of the vertically movable feed tube 28. The vertically movable feed tube 28 is free to move upward and downward with the upward and downward movement of the table 12 of the compacting press. As it does so, its first section 30 reciprocates on the fixed feed tube 22 and valve 24. It is desirable that the valve 24 extend beyond the top free end 34 and into the vertically moveable feed tube 28 throughout the cycle. The vertically movable tube's 28 opposite bottom end 36 is fixed to move with the table 12. In the first illustrated embodiment, the bottom end of the vertically movable tube 28 is fixed to a bridge 38 that is fixed to the top surface of the table 12. Thus, the entire vertically movable tube 28 moves with the table, reciprocating on the fixed tube 22 and valve 24 as it travels up and down.

The bottom end 36 of the vertically movable feed tube 28 has a circular opening 40 through which the raw material may be gravity fed. The bottom circular opening 40 is connected with a circular opening 42 at the top end 34 of the vertically movable tube 28 so that raw material received through the valve 24 may travel through the tube 28. The interior walls 44 of the tube 28 are smooth, without corrugations or pleats so that there are no crevices where the raw material could collect and coagulate; instead, there is a smooth interior passage 45 through the tube 28. The vertically movable tube is rigid, and may be made out of steel, as in the illustrated embodiment, or a similar material that can withstand the temperatures to which the raw material is to be heated if used to deliver warm raw material. In the illustrated embodiment, the vertically movable tube 28 has an outer wall 46 that is spaced from the inner walls 44 in the second section 32 of the vertically movable tube 28 to define a cavity 48 within which heated oil may be circulated to warm the contents of the tube 28. As shown in FIG. 1, an oil inlet 50 is formed in the outer wall 46 near the bottom end 36 of the tube 28 and is connected through an inlet conduit 52 to a source of heated oil 54. An oil outlet 56 is formed upstream of the inlet 50 near the top 34 of the tube 28. The outlet 56 is connected to an outlet conduit 58 which returns oil to the source 54 of heated oil for heating and recirculation through the heating system. There may be a series of baffles 60 in the cavity 48 to force the heated oil to flow through a circuitous path between the inlet and the outlet, as shown in FIG. 4.

The bridge 38 includes a horizontal top plate 70 spaced above and parallel to the table 12. The bridge top plate 70 is connected to and supported on a pair of side walls 72. The side walls 72 may be connected to the table 12 directly, or to a wear plate 74 that is removably attached to the table top 12 to protect the table top from damage.

Figure 2:
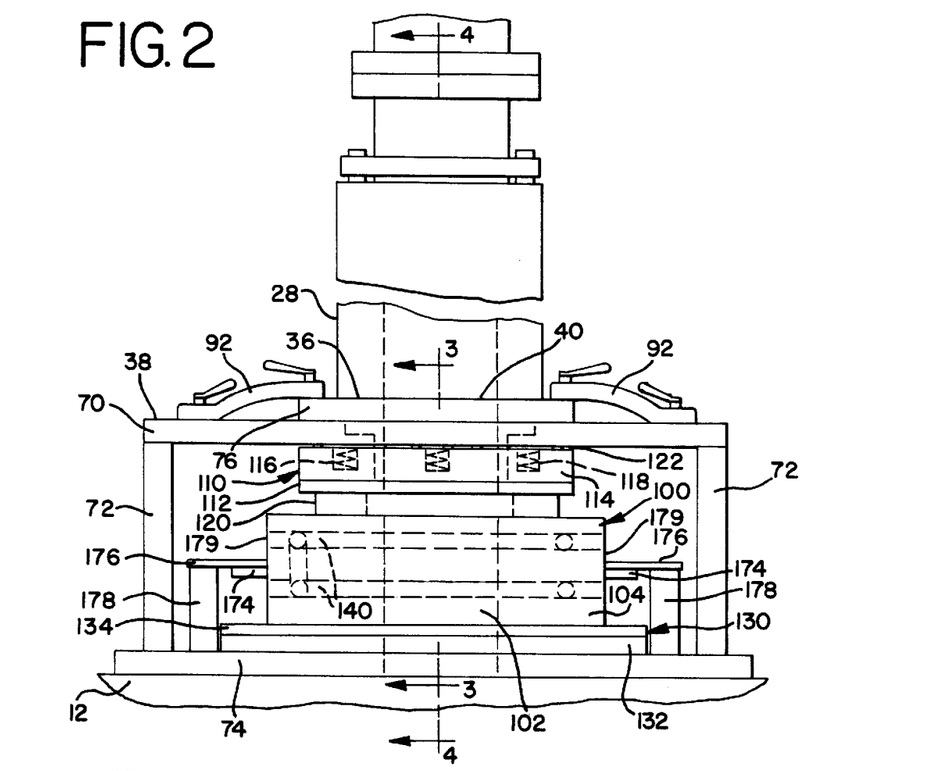
FIG. 2 is a partial front elevation of the embodiment of FIG. 1.
Figure 3:
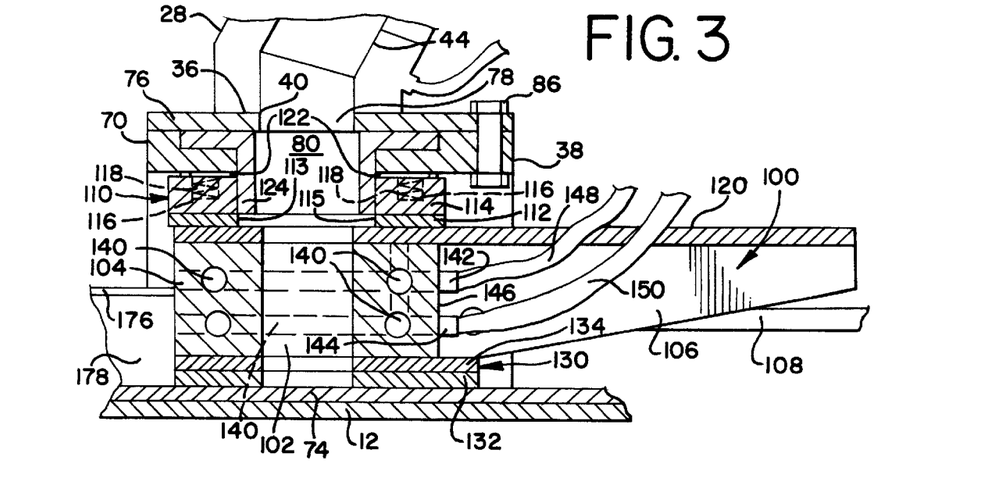
FIG. 3 is a partial cross-section taken along line 3—3 of FIG. 2.

As illustrated in FIGS. 2 and 3, the vertically movable feed tube 28 is connected at its bottom end 36 to a flat annular flange 76 that has flat top and bottom surfaces. The flange 76 has a central opening 78 that is coaxial with and generally of the same diameter as the bottom opening 40 in the vertically movable feed tube 28 so that material moving out of the feed tube passage 45 can move directly through the flange opening 78. The flat bottom face of the flange 76 may rest against the top surface of the bridge top plate 70 or against some intermediate member.

The flange 76 is affixed to the end of the feed tube 28 so that there is no relative movement between these parts, but the flange 76 and the connected feed tube 28 may swivel or be pivoted on the bridge plate between three possible positions. As shown in FIG. 5 at "A", the flange 76 and feed tube 28 may be aligned with a central circular opening 80 in the top plate 70 of the bridge for normal operation wherein the raw material flows from the feed tube 28 through the flange opening 78 and circular opening 80. The circular opening 80 extends through both the bottom and top faces of the bridge top plate 70 so that the raw material may travel down through the bridge. When it is desired to block the path of the raw material coming through the feed tube 28, such as when the die is being changed, the flange 76 and feed tube 28 may be pivoted to the position shown in FIG. 5 at "B" where the solid top plate 70 of the bridge blocks the end opening 40 of the feed tube and flange opening 78. When it is desired to change the raw material and drain the old raw material from the system upstream of the flange 76, the flange and feed tube 28 may be pivoted to the position shown in FIG. 5 at "C", where the feed tube opening 40 and flange opening 78 are aligned over a cut-out 82 at the rear edge of the top plate 70 of the bridge. The edge of the cut-out 82 can be chamfered to hold the rim of a drain cup 84 that will receive and hold the drained raw material.

As shown in FIG. 5, the flange 76 and vertically movable feed tube 28 are pivotable between the "A", "B" and "C" positions about a pivot 86 that may be a rivet, bolt, or other means for pivotally mounting the bottom end of the feed tube on the horizontal plate so that the bottom opening can be pivoted to a delivery position aligned with the plate bore and can be pivoted to a drain position wherein the bottom opening is spaced from the plate bore. In the illustrated embodiment, the axis of the pivot 86 is co-linear with the central vertical axis 88 of the first vertical section 30 of the vertically movable feed tube 28 which is coaxial with the central vertical axis 90 of the fixed tube 22 and valve 24.

To hold the flange and vertically movable tube 28 in the operable position shown at "A" in FIG. 5, a plurality of clamps 92 may be attached to the top plate 70 of the bridge. In the illustrated embodiment, the clamps 92 are pivotable about an axis spaced from the path of movement of the flange, and extend over the flange, and may be tightened against the flange to hold it down against the top plate of the bridge, to keep raw material from leaking out of the flange/top plate interface and to limit pivoting of the flange. A suitable type of clamp is a thumb toggle clamp with quick release levers, although any kind of quick release clamp may be used.

Figures 6A, 6B:
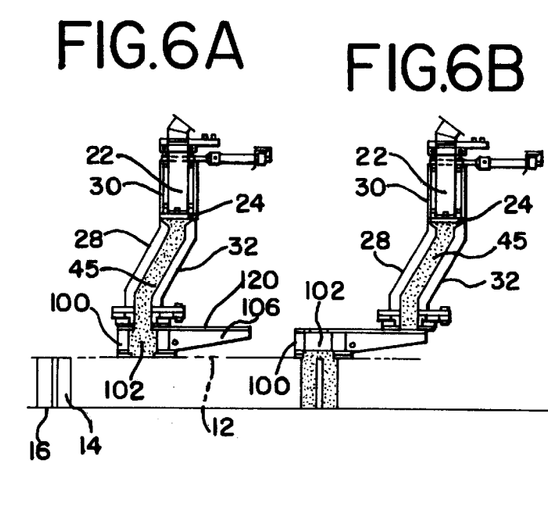
FIGS. 6A–6E are partial cross-sections, taken along the same lines as FIGS. 3 and 4, showing the varying positions of the feed shoe and press table, and showing filling and delivery of raw material.

Beneath the bridge 38 the illustrated raw material delivery system provides a feed shoe 100. As shown in FIG. 3, the feed shoe has a central bore 102 extending through its height that serves as a hopper for holding raw material. The feed shoe is designed to reciprocate between two positions: a retracted position, as shown in FIGS. 6A, 6C–6E, where the central bore or shoe hopper 102 is aligned beneath the bores 78, 80 of the flange 76, and bridge top plate 70 to receive raw material delivered through the bottom hole 40 of the vertically movable feed tube, and an extended position, as shown in FIG. 6B, where the shoe has moved horizontally across the table 12 or wear plate 74 to where the central bore or shoe hopper 102 is aligned over the die 16 so that the raw material falls from the central bore or shoe hopper 102 into the die cavity 14.

The illustrated feed shoe 100 has a main body 104 which surrounds the central bore 102 and two feed shoe tails 106 extending rearwardly from the main body. The feed shoe tails 106 may be pivotally connected to a clevis-shaped connected arm assembly 108 as shown in FIG. 1 which may be connected to a device that imparts reciprocating motion to the feed shoe, such as a ball screw feeder device (not shown). An appropriate ball screw device may be one supplied by Allen-Bradley Co., of Highland Heights, Ohio and Lebanon, N.H. as Model ETS32. It should be understood that this identification is for purposes of illustration only; any device that will impart controlled reciprocating motion may be used.

Since the feed shoe has surfaces that move with respect to the bridge and the table, it is preferred that seal structures be provided to limit or prevent leaks at these interfaces, and to prevent cross-ventilation that could cool the warm metal powder. In the illustrated embodiments, the bridge seal 110 comprises an annular "Teflon" brand type of flexible sealing ring 112 secured to an annular metal backing ring 114. The sealing ring and metal backing ring 112, 114 are suspended from beneath the top plate 70 of the bridge 38, between the bridge and the top surface of the main body 104 of the feed shoe. Both the sealing ring and backing have openings 113, 115 aligned with the bore 80 in the top plate 70 to provide a path for passage of the raw material to the feed shoe bore 102. A plurality of recesses 116 are formed in the metal backing ring 114, with springs 118 disposed in the recesses. The springs 118 act against the underside of the top plate 70 of the bridge and the metal backing ring 114 and serve to push or bias the sealing ring 112 against the top plate or surface 120 of the feed shoe main body 104 to create a seal. Thus, the top surface 120 of the feed shoe acts as a valve for the bridge seal, and allows the feed shoe cavity 102 to fill when in the retracted position under the bridge assembly. As shown in FIG. 3, there is a small annular gap 122 between the metal backing ring 114 and the underside of the bridge top plate 70 to allow for some height variation. To block the gap 122 and prevent raw material from leaking out through this gap 122, an annular liner 124 is provided in the central circular opening 80 in the bridge top plate 70. The liner 124 extends past the underside of the bridge top plate and toward the sealing ring 112 to cover the gap 122. The liner 124 may have a top surface received in a chamfer in the bridge top plate 70. The bridge top plate opening 80 may be chamfered and the liner 124 may have a lip to fit the chamfer to suspend the liner 124 from the plate 70. To prevent the bridge seal 110 from falling from the top plate 70, it may be suspended by bolts that limit the size of the gap 122.

The bridge top plate 70, liner 124 and bridge seal 110 all serve to enclose the path between the bottom opening 40 of the vertically movable feed tube 28 and the central bore 102 of the feed shoe 100. Thus, the heated metal powder may pass from the feed tube 28 to the feed shoe 100 free from exposure to a cross-flow of air, and the temperature of the heated metal powder is maintained. Other seal structures that enclose the path to provide a seal against cross-flow of air between the feed tube 28 and feed shoe 100 may be used and are within the scope of the invention.

In the illustrated embodiment, the main body 104 of the feed shoe 100 is made of aluminum. The illustrated top plate or surface 120 is a ground steel plate.

The second seal is a table seal or wiper 130 comprising an annular "Teflon" brand type of sealing wiper ring 132 acting against the surface of the table 12 or wear plate 74. The annular sealing ring 132 is connected to an annular metal backing plate 134 that is secured to the underside of the main body 104 of the feed shoe 100. The openings or bores in the sealing ring and metal backing plate are aligned with the bore 102 of the feed shoe to provide a path for the raw material to pass through the table seal to the die cavity 14 when the feed shoe is properly aligned over the die cavity.

For applications using heated powder, the material used for the rings 112, 132 is preferably one that will be stable up to temperatures of about 450° F. Any material that will withstand this temperature and provide the desired seal may be used. For example, a steel sealing ring could be used. Although it may be possible to use a one-piece combined backing and sealing ring for the illustrated two pieces 112, 114 and 132, 134, it is preferable to use a separate sacrificial sealing ring that may be easily replaced as it becomes worn.

It may be desirable, if the raw material is to be delivered warm to the die cavity, to provide for heating the feed shoe central bore or hopper 102. Two alternative shoes are illustrated for this purpose. In the first embodiment, the solid main body 104 of the feed shoe surrounding the hopper 102 has a plurality of fluid flow paths 140 through which a material such as hot or warm oil may be circulated to warm the hopper and its contents. In the illustrated embodiment, the fluid flow paths 140 comprise two interconnected planar paths, one above the other. The paths may be formed by boring four linear intersecting paths at each level and then blocking the ends of the paths between the points of intersection and the outer surfaces of the body. A fluid inlet 142 and fluid outlet 144 may be provided along the rear face 146 of the body 104 and connected by fluid inlet 148 and outlet 150 conduits to the source of hot oil 54 for a continuous source of recirculating oil.

Figures 7, 8, 9:
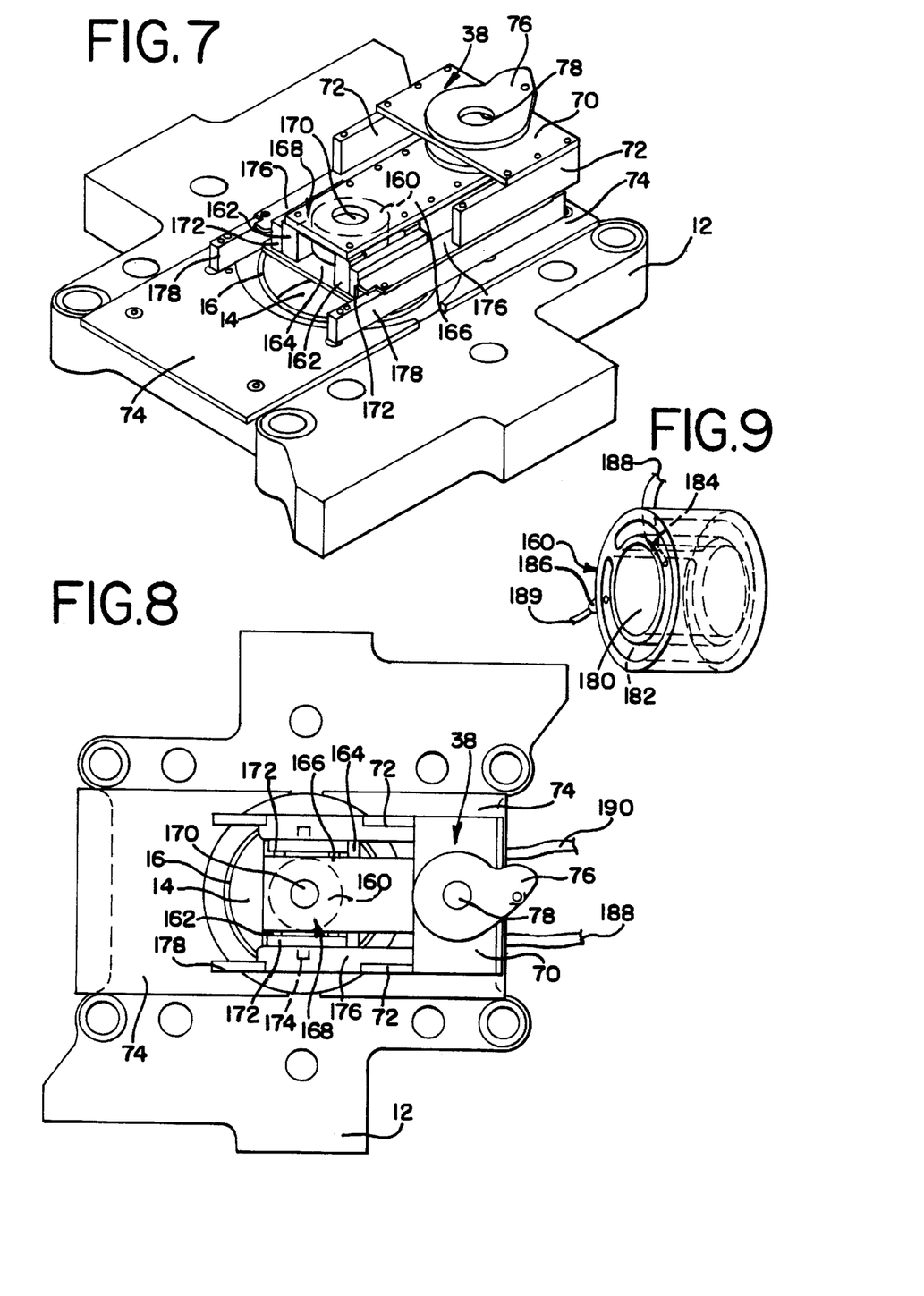
FIG. 7 is a partial perspective view, with parts removed for clarity, of another embodiment of the invention, showing the press table, feed shoe, bridge and flange.
FIG. 8 is a top plan view of the embodiment of FIG. 7.
FIG. 9 is a perspective view of the removable heated hopper of the embodiment of FIGS. 7 and 8.

Alternatively, as shown in the embodiment of FIGS. 7–9, where like reference numbers have been used for like parts, the feed shoe may include a removable heating hopper 160. In this embodiment, instead of a solid main body, the feed shoe has a plurality of upright supports 162 extending upward from a flat, horizontal metal plate 164 to support the top surface 166 of the feed shoe 168. The top surface has a bore 170 between the supports 162. The supports 162 are spaced apart a distance sufficient to receive the heating hopper 160 between them.

Outboard of the supports 162 and connected thereto are a pair of guide post supports 172 which hold outwardly extending roller guide pins 174 which fit beneath horizontal guide rails 176 which are supported by guide rail supports 178 secured to the wear plates 74 on the table 12. The roller guide pins control the path and downward clamping force of the feed shoe. A similar arrangement of horizontal guide rails 176 and guide rail supports 178 are used in the first illustrated embodiment, although in that embodiment the roller guide pins 174 may extend directly out from the sides 179 of the feed shoe main body 104, as shown in FIG. 2.

In the embodiment of FIGS. 7–9, the same numbers as used with respect to the embodiment of FIGS. 1–5 have been used for the bridge 38 although the side walls 72 extend upward from the horizontal guide rails 176 in the embodiment of FIGS. 7–9. As in the embodiment of FIGS. 1–5, a flange 76 is used to connect the movable feed tube (not shown in FIGS. 7–9), although the top plate 70 of the bridge need not allow for pivoting of the flange as in the preferred embodiment of FIGS. 1–5.

The removable heating hopper 160 illustrated in FIG. 9 is annular, with a central bore 180 and an outer sleeve carrying a heating element. In the illustrated case the heating element is a fluid flow path 182 with an inlet 184 and an outlet 186 connected by conduits 188, 189 to a source of heated oil (not shown). Such a non-electric heating element is preferred at this stage of the delivery system, since use of an electric heating element could set up a magnetic field that would adversely affect delivery of powdered metal to the die cavity.

Generally, the feed shoe of the first illustrated embodiment may be preferred for larger parts to be produced, as it allows for a larger bore or hopper volume, thereby allowing more material to be held in the feed shoe, and thereby allowing for the production of larger parts. In either embodiment it may be desirable to use a heat-conductive insert in the central bore to decrease its volume for some applications.

Regardless of the type of heating system used, and regardless of whether the delivery system even includes a heating element, the delivery system of the present invention may use a valve 24 such as that shown in FIGS. 10–14 as a means for selectively allowing raw material to pass from said vertically fixed tube through the vertically movable feed tube. As there illustrated, the valve 24 is part of the fixed vertical feed tube 22, the entirety of which can be considered to be the valve. At or near the top end 23 of the vertical feed tube 22 there is a pivotal ring 190 surrounding the vertical tube 22 and capable of pivoting about the central vertical axis 90 of the tube. The pivotal ring 190 is connected through elongate interconnecting posts 192 to a pivotal end gate 194, which is also pivotable about the central vertical axis 90 of the tube. Above the pivotal end gate is a fixed apertured member 196 attached to the sides of the tube 22 by a series of cap screws or the like. The gate and apertured member are connected together at their centers by a post 197 that allows the pivotal end gate 194 to pivot.

The illustrated fixed apertured member 196 has three cutouts 198A, 198B, 198C separated from each other by 45 degree increments. The three cut-outs 198A, 198B, 198C provide three defined volumetric openings for allowing raw material such as powdered metal to pass therethrough. The pivotal end gate 194 has three orifices 200A, 200B, 200C that are complementary in size and configuration to the cut-outs 198A, 198B, 198C of the fixed apertured member 196. In the illustrated embodiment, to open the valve, the pivotal end gate 194 is pivoted to a position wherein its orifices 200A, 200B, 200C are aligned with the cut-outs 198A, 198B, 198C by causing the top ring to turn. When the top ring 190 turns, the turning motion is translated to the gate 194 through the posts 192. To close the valve, the pivotal end gate 194 is pivoted to a position wherein the orifices 200A, 200B, 200C are out of alignment with the cutouts 198A, 198B, 198C, to prevent sifting of raw material through the cutouts and orifices. To ensure positive closure of the valve when desired, it is preferable that the orifices 200A–C of the gate 194 be slightly smaller than the cutouts 198A–C.

Figures 10, 11, 12, 13, 14, 15:
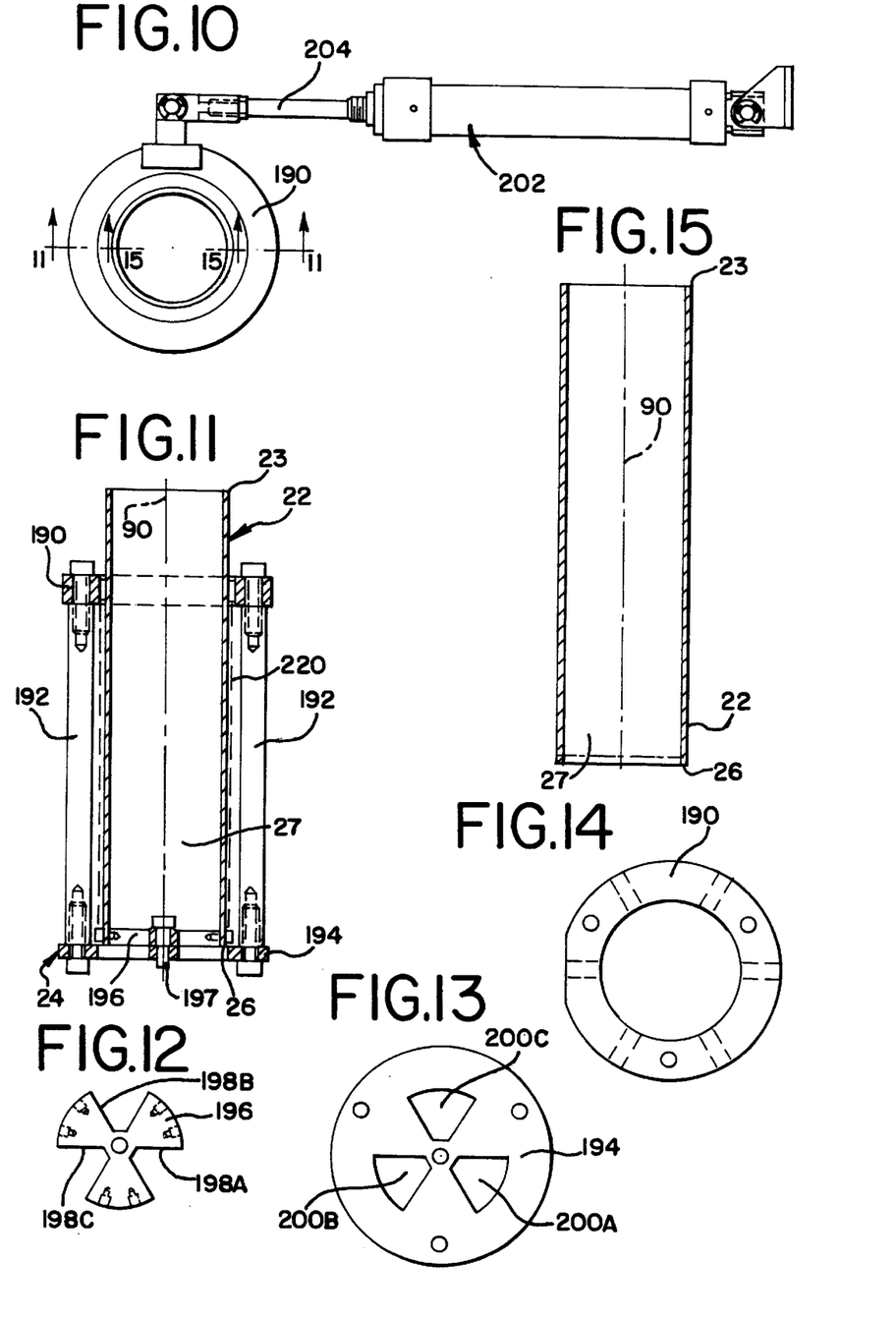
FIG. 10 is a top plan view of one embodiment of the fixed feed tube, valve and actuator of the present invention.
FIG. 11 is a cross section taken along line 11—11 of FIG. 10.
FIG. 12 is a top plan view of the fixed apertured member of the valve of FIG. 11.
FIG. 13 is a top plan view of the pivotal end gate of the valve of FIG. 11.
FIG. 14 is a top plan view of the pivotal ring of the valve of FIG. 11.
FIG. 15 is a cross-section, taken along line 15—15 of FIG. 10, showing the vertically fixed feed tube alone.

An air actuator 202 is provided in the illustrated embodiment, tangentially connected to the ring 190 at the top 23 of the tube 22 as shown in FIG. 10 so that as the actuator rod 204 is pushed out and pulled back, the ring 190 turns about the axis 90. This turning of the ring 190 rotates the gate 194 to align the orifices 200A–C and cut-outs 198A–C when the valve is opened and to take them out of alignment when the valve is closed.

Other types of valves may be used to control the passage of raw material from the fixed to the movable feed tubes. For example, it may be desirable to use a pair of slotted plates, one overlying the other and reciprocable over the other between blocked and open positions. As will be understood by those in the art, other alternative valves could be used, such as a ball valve.

Preferably, the actuator 202 is adjusted to be controlled by the operation of other parts of the press rather than merely by timing. One way of operating the valve and other parts of the raw material delivery system of the present invention is shown in FIG. 6A–6E. As illustrated in FIG. 6A, when the table 12 is at its full height and the feed shoe 100 is aligned under the tube 28, the valve 24 may be set so as to be open so that the raw material sifts through the aligned orifices and cut-outs and into the interior passage 45 of the vertically movable tube 28. The bottom opening 40 of the feed tube 28 is aligned with the central bore 102 in the feed shoe 100, so that the raw material fills the central bore of the feed shoe, as shown by the darkened areas in FIG. 6A. When the feed shoe is moved forward so that its central bore 102 is aligned with the die cavity 14, the contents of the feed shoe bore 102 are dropped into the die cavity. Preferably, the valve actuator is set to close the valve before the feed shoe moves forward to the position shown in FIG. 6B. The interior 45 of the vertically movable feed tube 28 remains filled with raw material because the opening 40 at its bottom end 36 is blocked by the top surface 120 of the feed shoe main body that extends rearward over the tails 106.

Figure 6C:
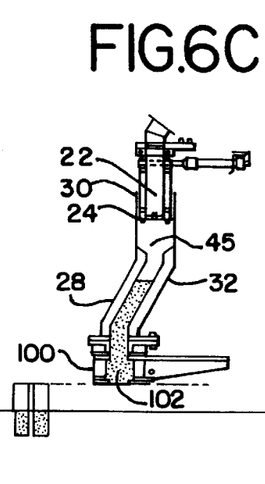

Next, as the feed shoe 100 returns to its retracted position beneath the movable feed tube 28, as shown in FIG. 6C, and the table 12 drops for compaction of the raw material in the die cavity 14, the valve 24 remains closed. The first coaxial section 30 of the movable feed tube 28 moves down with the bridge and table while the fixed tube 22 and valve 24 remain in their vertical position.

Figure 6D:
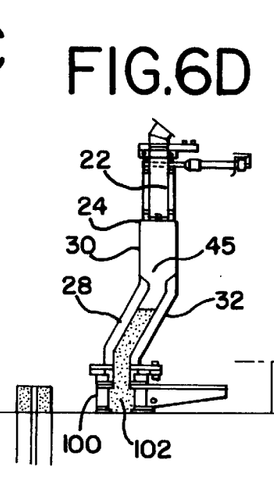

Next the compacted part is stripped from the press by moving the table still further downward as shown in FIG. 6D. The valve 24 remains closed so the interior 45 of the feed tube 28 does not overfill. The first coaxial portion 30 of the movable feed tube 28 continues to telescope down, exposing greater parts of the fixed tube 22. The length of the first coaxial portion 30 is great enough so that when the table is at its lowest, at least the valve 24 and bottom end of the fixed tube are still within the cylindrical first part 30 of the movable tube 28. The inner diameter of the first coaxial portion 30 is great enough so that it may slide up and down over the valve 24, including the pivotal gate 194 and posts 192.

Figure 6E:
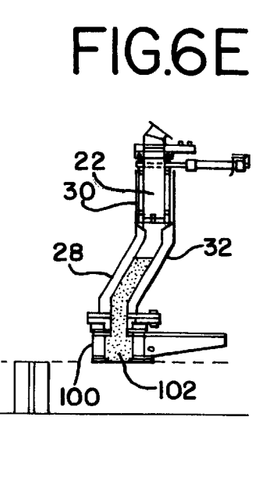

Next, the table 12 cycles back to the original raised position, as shown in FIG. 6E, raising the vertically movable feed tube 28 so that the first coaxial portion 30 moves up the fixed tube 22. The valve 24 is ready to open to fill the interior 45 of the vertically movable feed tube 28.

Thus, in the illustrated embodiment, the actuator is controlled to open the valve 24 when the table 12 is up and the feed shoe 100 is in the retracted position beneath the vertically movable feed tube. At all other times, the valve is preferably closed. Generally, the valve should be open when the table is at its highest position and preferably closed before the table drops away from this position.

Position switches (not shown) may be located both over the die area and in the full retract positions. For example, it is preferred to have switches to sense the position of the feed shoe to ensure that the press does not impact the feed shoe. For this purpose, there may be one position switch over the die to sense whether the feed shoe is present, and another switch may be disposed to detect when the feed shoe is in the retracted position as a fail safe in case of failure of the first switch.

It may be desirable to include a powder level sensor (not shown) in the interior passage 45 of the vertically movable feed tube 28 below the position of the valve to control the operation of the valve 24. The valve 24 could be set to open, for example, only when the powder level falls below a pre-set level. Such a control could be independent of the positions of the table and feed shoe, or could be used in combination with valve controls based on the table and feed shoe positions.

As will be understood from this description of the operation of the delivery system, it is not necessary that the vertically movable feed tube 28 have the two portions 30, 32 as shown in the attached drawings. The entire vertically movable feed tube 28 could be coaxial with the valve 24 and fixed feed tube 22. However, by providing the two sections of the movable feed tube 28 as described, so that the central axis of the bottom hole 40 is different from the central vertical axis 90 of the fixed tube 22, the movable feed tube 28 may be pivoted to block or drain it as shown in FIG. 5 without disconnecting the fixed and movable tubes 22, 28 from each other. This feature is particularly advantageous when changing the raw material, such as when changing to a different metal powder, to make the changeover relatively fast and easy. To further facilitate the changeover, it may be desirable to provide a manual override on the valve so that it may be manually opened for draining the raw material from the system.

And although different structures for the bridge 38 have been illustrated and described, it is advantageous if the distance between the side wall supports 72 is greater than the opening in the table to receive the die so that the die may be easily removed and changed.

It should be understood that the raw material delivery system of the present invention may be used with presses operating on room temperature or temperature-controlled materials. The illustrated embodiments are particularly useful when making parts from warm metal powder. To warm the powder to the desired temperature, the illustrated embodiment provides a pre-heater 20 which may be an oil-heated cylinder within an outer sleeve surrounding an inner cylinder within which the raw material may be carried. To keep the raw material from cooling while in the valve or vertical tube 22, the walls of the tube may be heated by an electric heater 220 comprising resistors adhered to the outer surface of the tube 22. Other means for heating the contents of the vertically fixed tube may be used; it may be possible to heat the vertically fixed tube with a liquid, such as hot oil, flowing into and out of a jacket, through an inlet and outlet positioned so as to not interfere with movement of the vertically movable feed tube 28.

In the illustrated embodiment, the tube 22 may be made of round mechanical tubing drawn over a mandrel and welded with, for example, a 13 gauge wall thickness.

In the illustrated embodiments, at least a portion of the vertically movable feed tube 28 is heated by a flow of heated oil through the cavity 48 between the exterior 46 and interior 44 walls of the second section 32 of the vertically movable tube 28. The main body 104 of the feed shoe 100 surrounding the central bore 102 may also be oil-heated, as may be the removable heated hopper 160 in that embodiment.

The appropriate temperature to which the raw material should be heated, and the appropriate temperature to which the heat transfer medium, such as the oil, should be heated can be expected to depend on the materials used. For example, when working with lubricated powdered metal as the raw material, it is important not to have the powder temperature too high for a given part, or else the heat generated during the compacting operation could cause the powder temperature to approach or exceed the melting point of the lubricants admixed with the powdered metals. Operating near or above the critical powder temperature can cause workpiece ejection problems and streak lines on the finished workpiece. Moreover, the useful life of the compacting tools may be shortened if the die temperature and powder temperature become so hot that ejection of the part becomes difficult.

Suitable lubricated metal powders are available from sources such as Hoeganaes under the name "ANCHORDENSE" and from Quebec Metal Powders under the name "FLOMET". When a lubricated powdered metal is used, its preferred temperature when reaching the die will depend on the type of powder, the density desired and the overall length or geometry of the part. In any case, the preferred temperature range for the powdered metal is usually below the softening point of the lubricant in the powder; the preferred temperature range for the powder is typically in the range of about 180°–300° F. The oil heater may be one that maintains a similar temperature range, at a static oil pressure of, for example, 20–40 psig, with a rate output of, for example, at least 122,800 BTU/Hr. As shown in FIG. 1, the oil heater, or source of heated oil 54, may deliver heated oil at this temperature and pressure to the pre-heater 20, the vertically moveable tube 28 and the feed shoe body 104 or hopper 160. The temperature of the electric heater 220 on the fixed tube 22 may be set for a similar temperature range. It may be desirable to provide for setting the pre-heater 20 at a lower temperature to prevent caking. A solenoid valve, for example, could be provided for separate control of the flow of hot oil for such zone heating of the pre-heater or other part. It may also be desirable to provide for heating the die, which may also be set at a slightly lower temperature. A system such as that illustrated may, for example, provide about 750 pounds of powder per hour to the compacting press.

The materials selected for the parts designed to serve as heat exchange surfaces should be selected to be effective for that purpose. For example, stainless steel is a relatively poor heat transfer material, and is preferably not used for the interior wall 44 of the vertically movable tube 28. Instead, a preferred material is a standard thin walled steel tube of good thermoconductivity and weldability. For example, a one-eighth inch thick mild steel material may be used. In addition, the feed shoe main body of the first illustrated embodiment may be made of aluminum for example.

Figure 16:
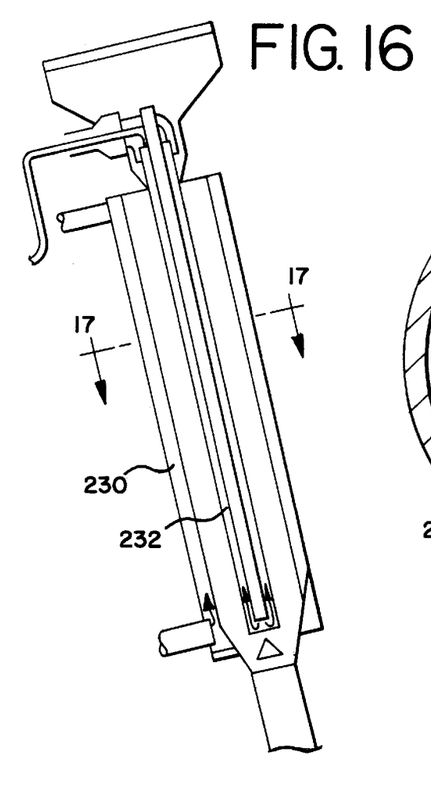
FIG. 16 is a cross-sectional view, taken along a central plane of an alternative embodiment of a pre-heater that may be used with the present invention.
Figure 17:
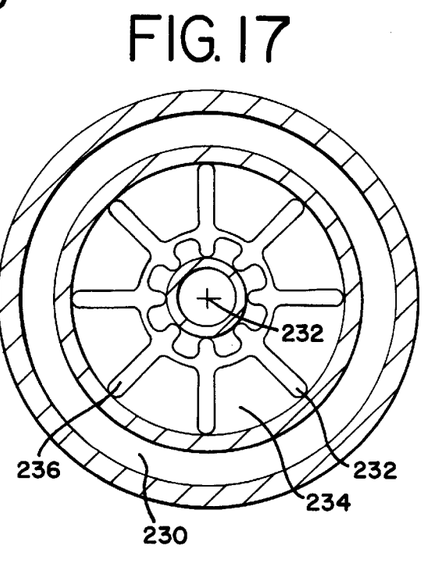
FIG. 17 is a cross-section taken along line 17—17 of FIG. 16.

It should be understood that other heat exchange structures can also be used. For example, for the pre-heater 20, a heat exchanger such as that shown in FIGS. 16–17 may be used. That structure has heated oil flowing not only through an outer sleeve 230 but also through an interior finned heat exchanger 232. The raw material such as the powdered metal drops through passageways 234 between the fins 236. As in the vertically movable tube 28, the fixed tube 22, and the feed shoe main body 104, the metal powder fills from the bottom up, and it is desirable to utilize a reverse flow of heated material such as the heated oil, so that the powder closest to the exit of each of the heaters is the hottest.

In operation, care should be taken in setting the fill levels, as well as using and timing the core rod in the up position. During operation, the valve 24 will allow the vertically movable feed tube 28 to fill to the bottom of the valve when the valve is in the open position, and the feed shoe 100 will accept powder from the vertically movable feed tube 28 when the feed shoe is in the retracted position, lowering the level of powder in the vertically movable feed tube and allowing additional powder to fall into the vertically movable feed tube 28 through the valve 24 from the vertically fixed feed tube 22. If the fill level is increased, powder could compact under the valve and cause damage to the valve assembly unless the powder is drained from the vertically movable tube prior to the change in fill level.

Care should also be taken if using the core rod "up" position in the press. In the heated applications, the feed shoe may contain pressurized hot oil, and the core rod should not come into contact with the feed shoe main body. If the core rod goes above the height of the die, it could either prevent the feed shoe from properly filling the die, or prevent it from returning to the retracted position. The limit switches should pick up any mistake prior to the upper punch causing damage, but the integrity of the feed shoe could be broken, causing hot oil to spill onto the table. The core rod could also damage the wear pad on the feed shoe if it makes contact. If the core rod in the up position is used, accurate timing of the equipment is necessary.

If it is necessary to change the die for a new part to be produced for example, the feed shoe may be removed for easy access to the cavity in the table. If the same powder is going to be used, the vertically movable feed tube may be pivoted to the position where the bottom end is blocked by the horizontal plate of the bridge (see FIG. 5B). If a different powder is going to be used, a drain cup can be placed on the drain cut-out 82 on the bridge 38, the source of the old metal powder can be removed, the vertically movable tube 38 can be pivoted to the drain position (see FIG. 5C), and the remaining powder can be allowed to drain into the drain cup and then stored for later use.

While only specific embodiments of the invention have been described and shown, it is apparent that various alternatives and modifications can be made thereto. Those skilled in the art will recognize that certain modifications can be made in these illustrative embodiments. It is, therefore, the intention in the appended claims to cover all such modifications and alternatives as may fall within the true scope of the invention.

We claim:

1. In a press operable in cycles for compacting raw material in a die to produce a product in each cycle, the press being of the type having a table with a horizontal surface and an opening in the horizontal surface for raw material to be delivered to the die, a system for delivering raw material to a die comprising:

a feed shoe having a central bore, said feed shoe being movable in a direction parallel to the table surface between an extended position wherein said central bore of said feed shoe overlies the die and a retracted position wherein said central bore of said feed shoe is spaced from the die;

a vertically movable feed tube for delivering raw material to said central bore of said feed shoe, said vertically movable feed tube having top and bottom ends with openings in each end and a passage between said openings, wherein said feed shoe is movable to said retracted position wherein the central bore of said feed shoe is aligned with said bottom opening, so that raw material can travel from said top opening through said passage and out said bottom opening and into said central bore when said feed shoe is in the retracted position, said vertically movable feed tube being supported to move with vertical movement of the table;

a vertically fixed feed tube telescopically received in said vertically movable feed tube, said fixed feed tube having top and bottom ends and a passage between said top and bottom ends, said passage being capable of receiving and holding raw material;

means for selectively allowing raw material to pass from said vertically fixed tube through to said vertically movable feed tube;

the table being vertically movable and being in a plurality of vertical positions during each cycle, the vertically movable feed tube moving with the vertical movement of the table to be in a plurality of vertical positions during each cycle, the vertically fixed tube maintaining a vertically fixed position with respect to the table during each cycle, the bottom end of the vertically fixed tube being received within the vertically movable tube at a plurality of vertical positions of the vertically movable feed tube during each cycle.

2. The system for delivering raw material of claim 1 wherein the means for selectively allowing raw material to pass from said vertically fixed tube is a valve comprising a stationary plate with openings through which material may pass and a movable gate with apertures and solid portions, the movable gate being pivotable to an open position wherein its apertures are aligned with the openings in the stationary plate and a closed position wherein the openings in the stationary plate are blocked by the solid portions of said movable gate.

3. The system for delivering raw material of claim 2 wherein the stationary plate and movable gate are positioned at the bottom end of said vertically fixed tube, the valve further including a rotatable ring at the top end of said vertically fixed tube, said rotatable ring and said movable gate being coaxial and being connected by axial posts so that the movable gate turns with turning of the rotatable ring, the valve further including means for selectively turning the rotatable ring.

4. The system for delivering raw material of claim 3 wherein said rotatable ring is positioned on said vertically fixed feed tube to be outside of the vertically movable feed tube throughout the full range of motion of the vertically movable feed tube.

5. The system for delivering raw material of claim 1 wherein said feed shoe has a top surface, the top surface having an opening in communication with the central bore, the opening aligned with the open bottom end of said vertically movable feed tube when in the retracted position, the solid part of said top surface being aligned with the open bottom end of said vertically movable feed tube when said feed shoe is out of the retracted position.

6. The system for delivering raw material of claim 1 wherein said vertically movable feed tube has a top section having a central vertical longitudinal axis at the top opening and a bottom section having a different central longitudinal axis at the bottom opening.

7. The system for delivering raw material of claim 6 wherein said vertically movable feed tube passage has a section with a central longitudinal axis that intersects the central longitudinal axis of said top portion.

8. The system for delivering raw material of claim 7 wherein said vertically movable feed tube is pivotable about said central longitudinal axis of said top section.

9. The system for delivering raw material of claim 7 further comprising a bridge having a horizontal plate with an opening through it, the bridge being supported on the table and movable with the table, said retracted position for said feed shoe being under said bridge, the bottom opening of said vertically movable feed tube being capable of being aligned with the opening in the horizontal plate of said bridge.

10. The system of delivering raw material of claim 9 wherein said vertically fixed feed tube has a central vertical axis co-axial with the central vertical axis of the top section of the vertically movable feed tube and said bottom end of said vertically movable feed tube is pivotally attached to said horizontal plate of said bridge, said vertically movable feed tube being pivotable about an axis along the central vertical axis of the vertically fixed feed tube with the vertically fixed feed tube received in the vertically movable feed tube.

11. The system of delivering raw material of claim 10 wherein said bottom end of said vertically movable feed tube is pivotable to a tool change position wherein the bottom opening is blocked by said horizonal plate.

12. The system of delivering raw material of claim 10 wherein said bottom end of said vertically movable feed tube is pivotable about the central vertical axis of the vertically fixed feed tube to a draining position wherein the bottom opening extends beyond an edge of said horizontal plate.

13. The system of delivering raw material of claim 9 wherein said horizontal plate is supported by spaced side walls, said feed shoe being movable between said side walls.

14. The system of delivering raw material of claim 13 wherein said side walls are spaced apart a distance greater than the width of the opening in the table so that the die may be removed from the opening without removing said side walls from the table.

15. The system of delivering raw material of claim 9 further comprising means for sealing said horizontal plate and said feed shoe top surface.

16. The system of delivering raw material of claim 15 wherein said means for sealing comprises an annular bridge seal suspended from said horizontal plate, spring means biasing said annular bridge seal against said top surface of said feed shoe and an insert extending from said horizontal plate downward to block any gap between said seal and said horizontal plate.

17. The system of delivering raw material of claim 1 wherein said vertically movable feed tube includes a bottom section that includes an inner wall and an outer wall, said inner wall surrounding said passage, an inlet and an outlet in said outer wall to define a fluid flow path from said inlet to said outlet so that said inlet can be connected to a source of heated fluid so that the raw material can be heated in said vertically movable tube.

18. The system of delivering raw material of claim 17 further comprising means for heating the contents of the vertically fixed feed tube.

19. The system of delivering raw material of claim 17 further comprising means for heating the contents of the central bore of said feed shoe.

20. In a press operable in cycles for compacting raw material in a die to produce a product in each cycle, the press being of the type having a table with a horizontal surface and an opening in the horizontal surface for raw material to be delivered to the die, a system for heating raw material and delivering heated raw material to a die comprising:

a feed shoe having a central bore, said feed shoe being movable in a direction parallel to the horizontal surface of the table;

a tube having top and bottom openings and a passage extending between the openings, the tube being supported independent from the table;

wherein said feed shoe is movable on said table to a retracted position wherein the central bore is positioned to receive raw material from said bottom opening and an extended position wherein the central bore is aligned over the die;

means for heating said raw material before the raw material reaches said feed shoe; and an enclosure with a bore through which raw material may pass, said enclosure extending between said feed shoe upper surface and said bottom opening of said tube so that when said feed shoe is in the retracted position material passing from said tube bottom opening to said feed shoe central bore passes substantially free from exposure to a cross-flow of air;

the table being vertically movable and being in a plurality of vertical positions in each cycle, the enclosure moving with the vertical movement of the table to be in a plurality of vertical positions in each cycle, the tube maintaining a vertically fixed position with respect to the table throughout the cycle, the bottom opening of the tube being received within the enclosure at a plurality of vertical positions of the enclosure during the cycle.

21. The system of claim 20 further comprising means for heating raw material in the central bore of said feed shoe.

22. The system of claim 21 wherein said feed shoe has a main body surrounding said central bore and wherein said means for heating raw material in the central bore of said feed shoe comprises a fluid flow path in said main body surrounding said central path, said fluid flow path having an inlet and an outlet so that it can be connected to a source of heated fluid to heat the contents of the central bore.

23. The system of claim 21 wherein said feed shoe includes an annular cylindrical insert defining the central bore and having a fluid flow path surrounding said central bore and an inlet and an outlet in communication with said fluid flow path so that said insert can be connected to a source of heated fluid to heat the contents of said central bore.

24. The system of claim 20 wherein said table is vertically movable said independently supported tube is fixed with respect to movement of the table and said enclosure includes a feed tube having a bottom end and further comprising means for supporting said bottom end of said feed tube above the table so that said feed tube moves vertically with vertical movement of the table.

25. The system of claim 24 wherein the bottom opening of said independently supported tube is telescopically received within the top opening of said feed tube, said feed tube being free to move vertically with respect to said independently supported tube, the bottom end of said independently supported tube being within said feed tube throughout the full range of motion of said feed tube.

26. The system of claim 25 further comprising a valve at the bottom of said vertically fixed tube to control passage of material from said vertically fixed tube to said feed tube.

27. The system of claim 25 further comprising means for heating the contents of said vertically fixed tube.

28. The system of claim 20 wherein said raw material includes a metal powder.

29. The system of claim 24 wherein said feed tube comprises a rigid structure with smooth inner walls.

30. The system of claim 24 wherein said means for supporting said bottom end of said feed tube above the table so that said feed tube moves vertically with vertical movement of the table comprises a bridge on which said feed tube is supported and wherein said enclosure further comprises an annular bridge seal suspended from said bridge below the bottom opening of the feed tube, means for biasing said annular bridge seal against said feed shoe upper surface when said feed shoe is in the retracted position, and means for blocking any gaps between said bridge and said annular bridge seal.

31. The system of claim 30 wherein said annular bridge seal comprises a flexible ring and a metal backing ring and said means for biasing said annular bridge seal against said feed shoe upper surface when said feed shoe is in the retracted position comprises a plurality of springs disposed between the bridge and the metal backing ring.

32. In a press for compacting raw material in a die to produce a product, the press being of the type having a table with a horizontal surface and an opening in the horizontal surface for raw material to be delivered to the die, a system for delivering raw material to a die comprising:

a feed shoe having a central bore with a central vertical axis, said feed shoe being movable in a direction parallel to the horizontal surface of the table;

a feed tube having top and bottom ends with openings in the ends and a passage extending between the openings, the opening at the top end having a central axis and the opening at the bottom end having a different central axis;

an assembly positioned to supply raw material to the top end of the feed tube, a portion of the assembly being received within the top end of the feed tube;

a horizontal plate positioned above the surface of the table and having a plate bore extending through the plate, the plate bore having a central vertical axis;

means for pivotally mounting said bottom end of said feed tube on said horizontal plate so that said bottom opening can be pivoted about the central axis of the opening at the top end of the feed tube to a delivery position vertically aligned with said plate bore and can be pivoted about the central axis of the opening at the top end of the feed tube to a drain position wherein the bottom opening is spaced from the plate bore;

wherein said feed shoe is movable on the table to a retracted position wherein the central bore is aligned beneath the bottom opening of said feed tube and said plate bore to receive raw material from said feed tube and an extended position wherein the central bore is aligned over the die.

33. The system for delivering raw material to a die of claim 32 wherein the edge of said plate has a cut-out and wherein said feed tube bottom end can be pivoted to position the bottom opening over the cut-out.

34. The system for delivering raw material to a die of claim 32 wherein said cut-out has a central axis beyond the table of the press.

35. The system for delivering raw material to a die of claim 32 wherein said feed tube bottom end can be pivoted to a blocked position wherein the bottom opening overlies a solid portion of said horizontal plate.

36. The system for delivering raw material to a die of claim 32 wherein said feed tube has a top portion having a longitudinal centerline, said top portion extending from said top end, said feed tube also having a bottom portion with a different longitudinal centerline.

37. The system for delivering raw material to a die of claim 36 wherein said feed tube has a central portion with a longitudinal centerline that intersects the longitudinal centerlines of said top and bottom portions.

38. The system for delivering raw material to a die of claim 32 wherein said feed tube is a rigid structure with smooth inner walls.

39. The system for delivering raw material to a die of claim 32 wherein said raw material travels through said feed tube free from any compressive forces exerted by said feed tube.

40. The system for delivering raw material to a die of claim 32 wherein said horizontal plate has a top side and a bottom side and wherein said feed shoe has a top surface, the system further comprising a seal between said bottom side of said horizontal plate and said top surface of said feed shoe.

41. The system for delivering raw material to a die of claim 40 wherein said seal comprises:

a flexible ring disposed against said top surface of said feed shoe;

an annular metal backing for said flexible ring;

spring means acting against said bottom side of said horizontal plate and against said metal backing ring for pushing said flexible ring toward said top surface of said feed shoe; and an annular cylindrical insert extending down through the opening in the horizontal plate below the bottom surface of the horizontal plate to block any gap between said horizontal plate and said annular metal backing.

42. In a press operable in cycles for compacting raw material in a die to produce a product in each cycle, the press being of the type having a table with a horizontal surface and an opening in the horizontal surface for raw material to be delivered to the die, a system for delivering raw material to a die comprising:

a horizontal plate positioned above the surface of the table and having a plate bore with a vertical axis extending through the plate;

a feed shoe having a central bore with a vertical axis, said feed shoe being movable in a direction parallel to the table surface between an extended position wherein said central bore of said feed shoe overlies the die and a retracted position wherein said central bore of said feed shoe is vertically aligned with the plate bore;

a vertically movable feed tube for delivering raw material to said central bore of said feed shoe, said vertically movable feed tube having top and bottom ends with openings in each end and a passage between said openings, wherein said feed shoe is movable to said retracted position wherein the central bore of said feed shoe is aligned with said bottom opening, so that raw material can travel from said top opening through said passage and out said bottom opening and into said central bore when said feed shoe is in the retracted position, said vertically movable feed tube being supported to move with vertical movement of the table;

a vertically fixed feed tube telescopically received in said vertically movable feed tube, said fixed feed tube having top and bottom ends and a passage between said top and bottom ends, said passage being capable of receiving and holding raw material;

a supply apparatus connected to supply raw material to the top end of the vertically fixed feed tube;

means for selectively allowing raw material to pass from said vertically fixed tube through to said vertically movable feed tube;

means for heating a portion of said vertically movable feed tube so that raw material in said passage is heated; and a seal with a central bore through which raw material may pass, said seal being positioned between said feed shoe upper surface and said bottom opening of said vertically movable feed tube so that when said feed shoe is in the retracted position material passing from said bottom opening to said central bore passes substantially free from exposure to a cross flow of air; and means for pivotally mounting said bottom end of said vertically movable feed tube on said horizontal plate so that said bottom opening can be pivoted to a delivery position aligned with said plate bore, to a blocked position wherein the bottom end of the feed tube overlies a solid portion of the horizontal plate spaced from the plate bore and to a drain position wherein the bottom opening is spaced from the plate bore and from the solid portion of the horizontal plate;

the vertically fixed feed tube having a central vertical axis, at least a portion of the vertically movable feed tube being co-axial with the vertically fixed feed tube, at least a portion of the vertically movable feed tube having a central vertical axis spaced from the central vertical axis of the vertically fixed feed tube, the means for pivotally mounting said bottom end of said feed tube on said horizontal plate allowing the vertically movable feed tube to be pivoted about the central vertical axis of the vertically fixed feed tube, the vertically movable feed tube being pivotable with the vertically fixed feed tube within the vertically movable feed tube and with the supply apparatus connected to the vertically fixed tube.

* * * * *